United States Patent
Vargantwar et al.

(10) Patent No.: US 8,842,589 B1
(45) Date of Patent: Sep. 23, 2014

(54) TRANSMITTING NOISE FRAMES IN A LIGHTLY-LOADED WIRELESS COVERAGE AREA

(75) Inventors: Sachin R. Vargantwar, Overland Park, KS (US); Ashish Bhan, Shawnee, KS (US); Maulik K. Shah, Overland Park, KS (US); Deveshkumar Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 392 days.

(21) Appl. No.: 13/344,188

(22) Filed: Jan. 5, 2012

(51) Int. Cl.
*H04B 7/00* (2006.01)
*H04W 28/02* (2009.01)

(52) U.S. Cl.
CPC .............................. *H04W 28/0221* (2013.01)
USPC ........................................................ 370/310.2

(58) Field of Classification Search
USPC ................................................. 370/310–349
See application file for complete search history.

(56) References Cited

U.S. PATENT DOCUMENTS

| | | | | |
|---|---|---|---|---|
| 4,646,287 A | * | 2/1987 | Larson et al. | 370/400 |
| 2010/0195501 A1 | * | 8/2010 | Tynderfeldt et al. | 370/235 |

* cited by examiner

*Primary Examiner* — Kwang B Yao
*Assistant Examiner* — Juvena Loo (57) ABSTRACT

A radio access network (RAN) may radiate to define a wireless coverage area that is configured to provide wireless coverage to wireless communication devices (WCDs). If the utilization of the wireless coverage area is below a low-utilization threshold, the RAN may begin transmitting noise frames in the wireless coverage area. In doing so, the transmitted signal strength of the wireless coverage area may increase, which in turn may increase the likelihood that the WCDs can acquire and use the wireless coverage area.

16 Claims, 6 Drawing Sheets

TRANSMITTING NOISE FRAMES IN A LIGHTLY-LOADED WIRELESS COVERAGE AREA

BACKGROUND

Some types of wireless network technologies, such as Code Division Multiple Access (CDMA), allow a wireless communication device (WCD) to communicate with a radio access network (RAN) via one or more wireless coverage areas. When the signal strength of the wireless coverage area, as received by the WCD, falls below a threshold value, the WCD may not be able to acquire and/or use the wireless coverage area. In some cases, the WCD may instead begin roaming to a wireless coverage area controlled by a different wireless network operator.

Overview

Roaming may occur when a WCD's wireless service provider (the "home" wireless service provider to which the WCD is subscribed) is unable to supply sufficient wireless coverage to the WCD, and the WCD is instead served by one of the home wireless service provider's roaming partners. Consequently, the roaming partner provides wireless service to the WCD for a period of time, typically until the home wireless service provider can once again provide sufficient wireless coverage to the WCD.

While roaming agreements may improve the overall wireless coverage available to WCDs, and therefore result in a better experience for WCD users, there are drawbacks to letting a WCD roam. One such drawback is that, while roaming, the WCD may not have access to applications and services offered by the home wireless service provider. Another drawback to roaming is that the roaming partner may charge the home wireless service provider a fee for each unit of time, unit of data, and/or transaction that the roaming partner serves a roaming WCD. Other drawbacks may exist as well. Therefore, in situations in which the WCD is likely to roam, it may be advantageous for the home wireless service provider's RAN to take measures to reduce this likelihood.

Wireless coverage areas of the home wireless service provider may be referred to as "preferred" wireless coverage areas. The WCD may be configured to attempt to acquire service from these preferred wireless coverage areas before attempting to acquire service from a "non-preferred" wireless coverage area of a roaming partner. In some cases, a WCD may fail to acquire service from a preferred wireless coverage area when the WCD is near the edge of the preferred wireless coverage area. However, in other cases, a WCD may experience a low received signal strength even if the WCD is within the expected range of the preferred wireless coverage area. For instance, if the traffic channel utilization of the preferred wireless coverage area is low, the aggregate power that the RAN uses to define the preferred wireless coverage area may also be low. If this aggregate power is low enough, the WCD may not be able to detect the preferred wireless coverage area. This may result in the WCD roaming, even though the WCD might be well within the normal range of the preferred wireless coverage area.

In order to reduce the likelihood of a WCD roaming in these and other circumstances, the RAN may take steps to increase the power received by WCDs served by a lightly-loaded wireless coverage area. For instance, the RAN may determine that a wireless coverage area is lightly-loaded, and in response to making this determination, the RAN may begin transmitting noise frames on one or more of the wireless coverage area's unused traffic channels. These transmissions may have the effect of increasing the received signal strength at the WCD, and increasing the likelihood that the WCD will be able to acquire and use the wireless coverage area.

Accordingly, in an example embodiment, a RAN may radiate to define a wireless coverage area that is configured to provide wireless coverage to WCDs. It may be determined that a utilization of the wireless coverage area is below a low-utilization threshold. Based at least on determining that the first utilization of the first wireless coverage area is below the low-utilization threshold, RAN may be instructed to transmit noise frames in the wireless coverage area.

In another example embodiment, a RAN may radiate to define a wireless coverage area that is configured to provide wireless coverage to WCDs. A first determination may be made that a first measured utilization of the wireless coverage area is below a low-utilization threshold. In response to making the first determination, a computing device may transition to a first state, wherein while in the first state the computing device instructs the RAN to transmit noise frames in the wireless coverage area. At some later point, a second determination may be made that a second measured utilization of the wireless coverage area exceeds the low-utilization threshold. In response to making the second determination, the computing device may transition to a second state, wherein while in the second state the computing device instructs the RAN to stop transmitting noise frames in the wireless coverage area.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

DESCRIPTION

I. Example Network Architecture

Figure 1:
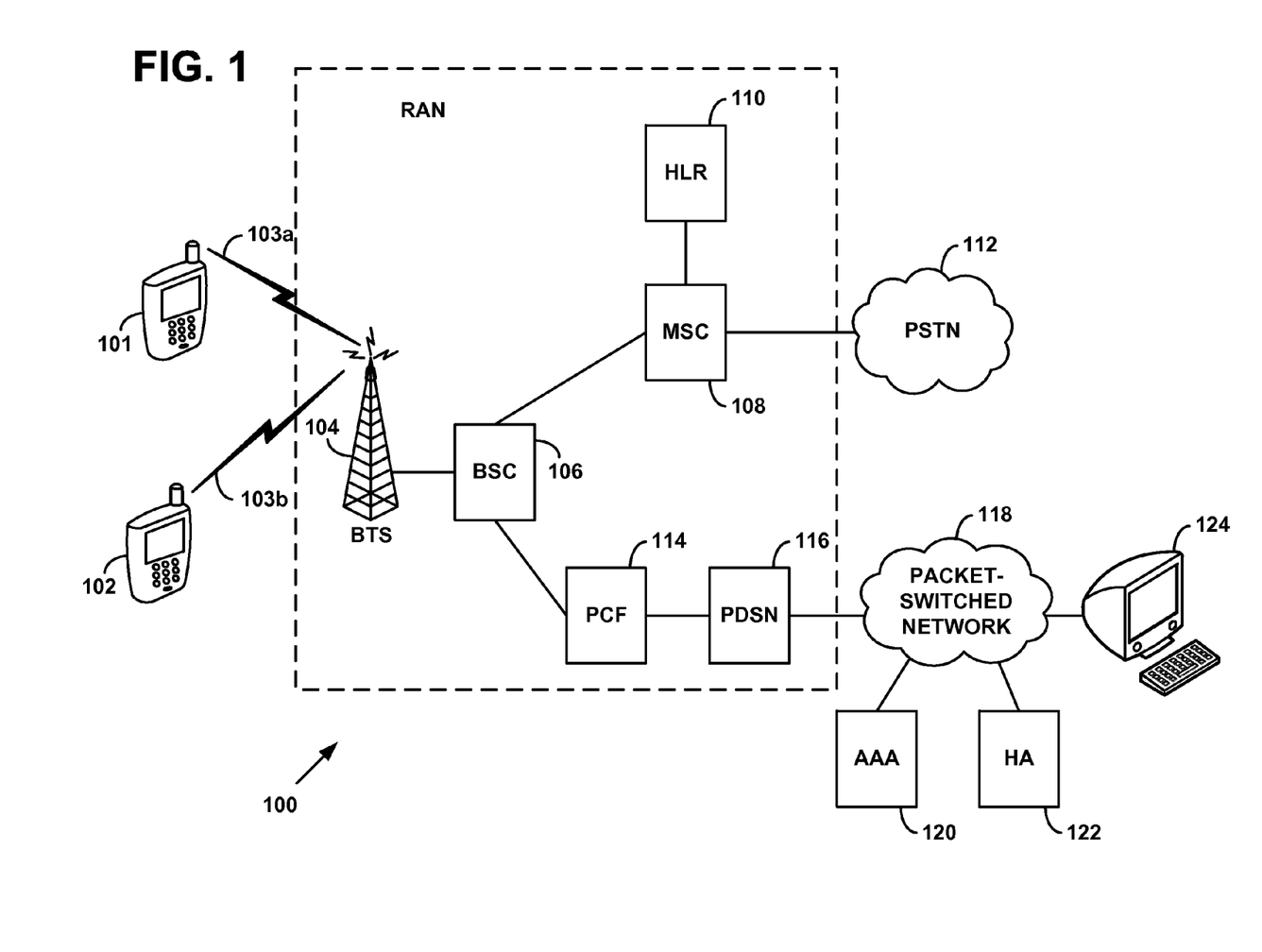
FIG. 1 depicts a RAN, in accordance with an example embodiment.

FIG. 1 is a simplified block diagram of a wireless communication system 100 in which example embodiments can be employed. WCD 101 may communicate over an air interface 103a with a base transceiver station (BTS) 104, which is, in turn, coupled to or integrated with a base station controller (BSC) 106. Similarly, WCD 102 may communicate over an air interface 103b with BTS 104. Transmissions over air interface 103a from BTS 104 to WCD 101 and over air interface 103b from BTS 104 to WCD 102 may represent "forward links" to the WCDs. Conversely, transmissions over air interface 103a from WCD 101 to BTS 104 and over air interface 103b from WCD 102 to BTS 104 may represent "reverse links" from the WCDs.

BSC 106 may be connected to a mobile switching center (MSC) 108. BSC 106, MSC 108, or both, may act to control assignment of air interface traffic channels, and may provide access to wireless circuit-switched services such as circuit-voice and circuit-data services. In practice, a BSC may serve multiple BTSs, each of which may define one or more wireless coverage areas.

As represented by its connection to public-switched telephone network (PSTN) 112, MSC 108 may also be coupled with one or more other MSCs or other telephony circuit switches, thereby supporting user mobility across MSC regions, as well as local and long-distance landline telephone services. A home location register (HLR) 110, which may be connected to MSC 108, may support mobility-related aspects of subscriber services, including dynamic tracking of WCD location and verification of WCD service privileges.

BTS 104, BSC 106, MSC 108, HLR 110, PCF 114, and PDSN 116 may be considered to be components of a RAN. However, a RAN may be made up by more or fewer components that perform the same or different functions.

As shown, BSC 106 may also be connected with a packet-data serving node (PDSN) 116 by way of a packet control function (PCF) 114. PDSN 116, in turn, provides connectivity with a packet-switched network 118, such as the Internet and/or a wireless carrier's private core packet-network. Nodes on network 118 may include, by way of example, an authentication, authorization, and accounting (AAA) server 120, a Mobile Internet Protocol (mobile-IP) home agent (HA) 122, and a remote computer 124.

After acquiring a traffic channel over air interface 103a, WCD 101 may transmit a request to PDSN 116 for a connection to the packet data network. Then, following authentication of WCD 101 by AAA server 120, WCD 101 may be assigned an IP address by PDSN 116 or by HA 122, and may thereafter engage in packet-data communications with entities such as remote computer 124. Similar procedures may take place for WCD 102, via air interface 103b.

Figure 2:
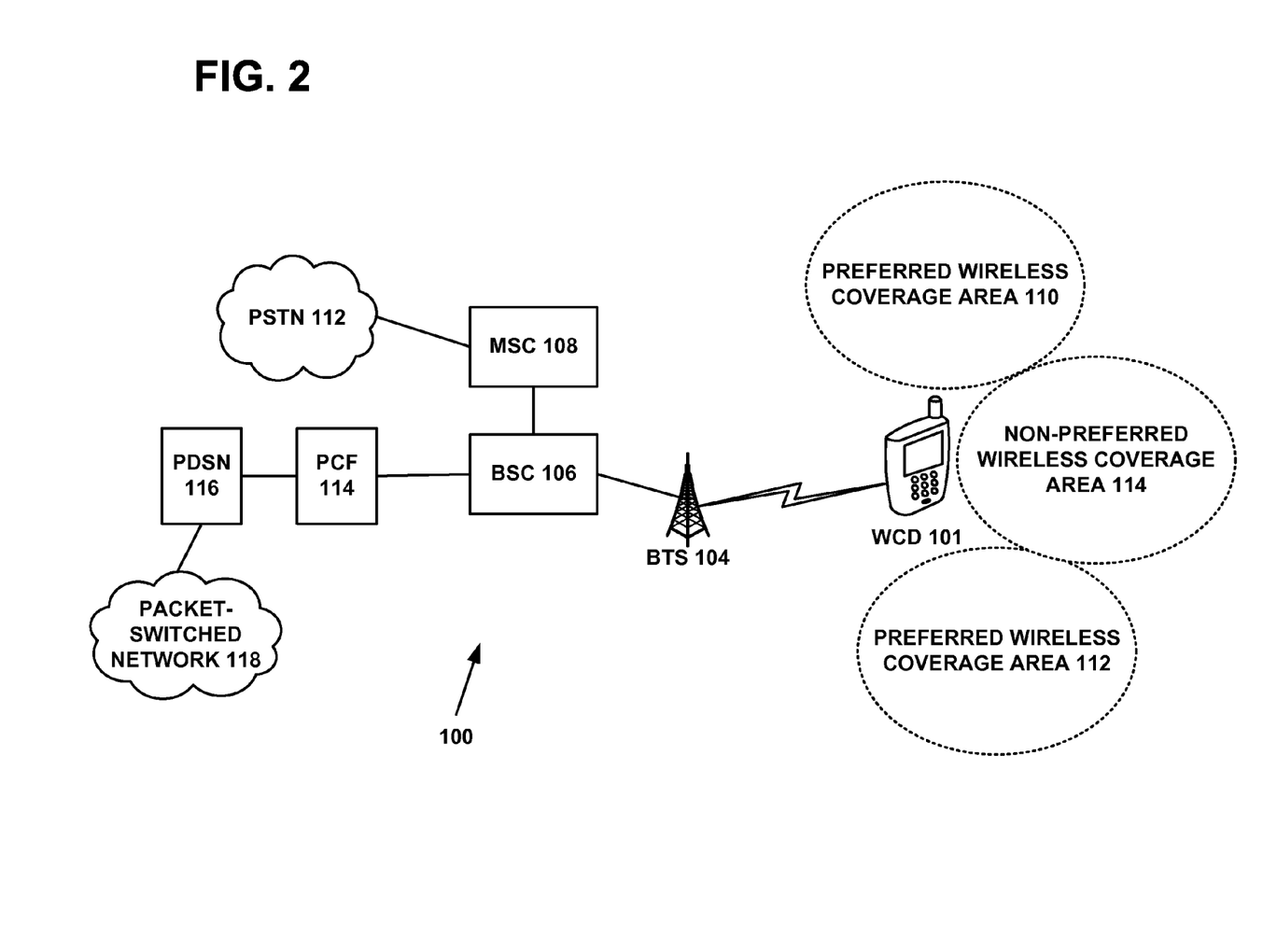
FIG. 2 depicts a WCD within range of preferred and non-preferred wireless coverage areas, in accordance with an example embodiment.

As a further example of a RAN configuration, FIG. 2 shows another view of wireless communication system 100. In this view, BTS 104 may radiate to define preferred wireless coverage areas 110 and 112. Alternatively, BTS 104 may define only one of these preferred wireless coverage areas, and a different BTS from wireless communication system 100 may define the other preferred wireless coverage area. The home wireless service provider (e.g., the entity that owns and/or operates wireless communication system 100) may categorize wireless coverage areas that the home wireless service provider operates and/or controls as "preferred," while categorizing wireless coverage areas that the home wireless service provider's roaming partners operate and/or control as "non-preferred." Thus, non-preferred wireless coverage area 114 may be defined by a roaming partner's RAN, and WCD 101 may be considered to be roaming if WCD 101 communicates via non-preferred wireless coverage area 114.

Although three wireless coverage areas are shown in FIG. 2, the embodiments herein may make use of more or fewer wireless coverage areas. For example, BTS 104 may radiate to define more than two preferred wireless coverage areas. Similarly, there may be more than one non-preferred wireless coverage area within range of WCD 101. While FIG. 2 depicts the physical coverage of preferred wireless coverage area 110, preferred wireless coverage area 112, and non-preferred wireless coverage area 114 as being mutually exclusive, in reality, the physical coverage of two or more of these wireless coverage areas may overlap with one another. Thus, for instance, preferred wireless coverage area 110 may fully overlap or not overlap at all with one or more of preferred wireless coverage area 112 and non-preferred wireless coverage area 114.

In general, the depictions of FIGS. 1 and 2 are illustrative. Therefore, in a RAN, there could be more or fewer of each element than is shown, and some elements may be omitted altogether. Additionally, other types of elements not shown may be present. Further, any of these elements may be combined with one another, physically or logically, or distributed across multiple physical devices. Thus, the particular arrangements shown in FIGS. 1 and 2 should not be viewed as limiting with respect to the present embodiments. For instance, BSC 106 may be replaced by one or more radio network controllers (RNCs), and MSC 108 may be replaced, in whole or in part, by one or more softswitch and/or media gateway components.

Figure 3:
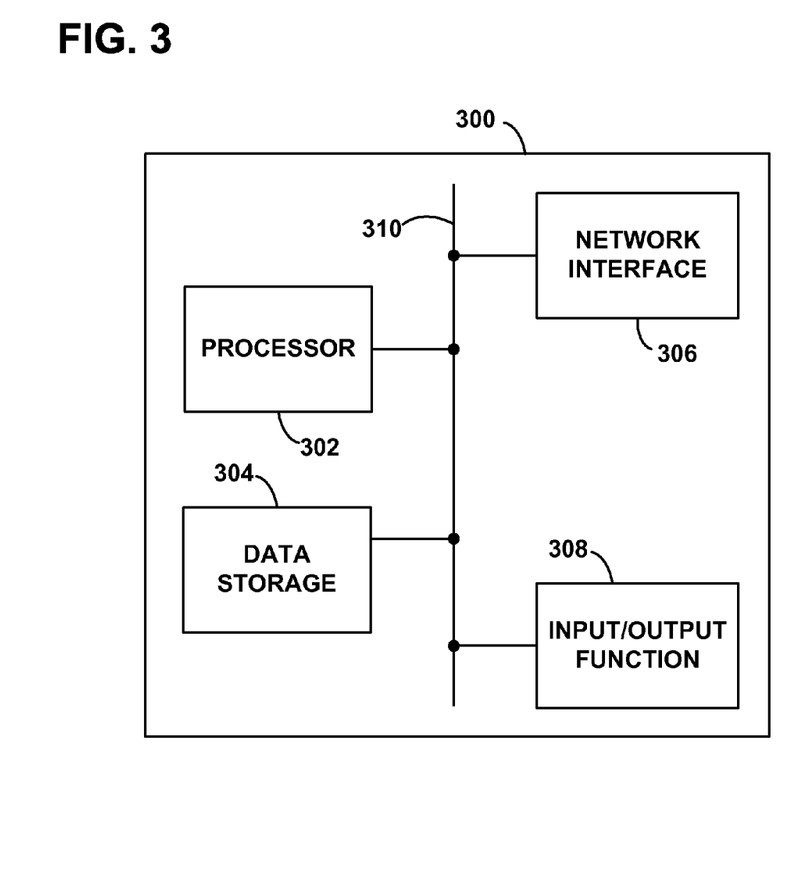
FIG. 3 is a block diagram of a computing device, in accordance with an example embodiment.

FIG. 3 is a simplified block diagram exemplifying a computing device 300. Example computing device 300 may be a RAN component (e.g., a BTS, BSC, RNC, MSC, etc.) or another type of component that is arranged to operate in accordance with the embodiments herein.

Example computing device 300 may include a processor 302, data storage 304, a network interface 306, and an input/output function 308, all of which may be coupled by a system bus 310 or a similar mechanism. Processor 302 may include one or more CPUs, such as one or more general purpose processors and/or one or more dedicated processors (e.g., application specific integrated circuits (ASICs) or digital signal processors (DSPs), etc.)

Data storage 304, in turn, may comprise volatile and/or non-volatile data storage and can be integrated in whole or in part with processor 302. Data storage 304 may store program instructions, executable by processor 302, and data manipulated by these instructions to carry out the various methods, processes, or functions described herein. Alternatively, these methods, processes, or functions can be defined by hardware, firmware, and/or any combination of hardware, firmware and software. Therefore, data storage 304 may be a tangible, non-transitory computer-readable medium, having stored thereon program instructions that, upon execution by one or more processors, cause example computing device 300 to carry out any of the methods, processes, or functions disclosed in this specification or the accompanying drawings.

Network interface 306 may take the form of a wireline connection, such as an Ethernet, Token Ring, or T-carrier connection. Network interface 306 may also take the form of a wireless connection, such as IEEE 802.11 (Wifi), BLUETOOTH®, or a wide-area wireless connection. However, other forms of physical layer connections and other types of standard or proprietary communication protocols may be used over network interface 306. Furthermore, network interface 306 may comprise multiple physical communication interfaces.

Input/output function 308 may facilitate user interaction with example computing device 300. Input/output function 308 may comprise multiple types of input devices, such as a keyboard, a mouse, a touch screen, and so on. Similarly, input/output function 308 may comprise multiple types of output devices, such as a monitor, printer, or one or more light emitting diodes (LEDs). Additionally or alternatively, example computing device 300 may support remote access from another device, via network interface 306 or via another interface (not shown), such an RS-232 or Universal Serial Bus (USB) port.

II. Example CDMA Communications

The embodiments herein will be described by way of example with reference to CDMA technologies. However, it should be understood that these embodiments can apply to other families of technologies now known or developed in the future.

In a CDMA wireless network, each wireless coverage area may employ one or more frequency bands, typically 1.25 MHz in bandwidth each, and each wireless coverage area may be distinguished from adjacent wireless coverage areas by a pseudo-random number offset ("PN offset"). Further, each wireless coverage area may concurrently communicate on multiple channels that are distinguished from one another by different CDMA codes (i.e., different Walsh codes). When a WCD operates in a given wireless coverage area, communications between the WCD and the BTS of the wireless coverage area may be carried on a given frequency and may also be encoded (e.g., modulated) by the wireless coverage area's PN offset and a given Walsh code.

Air interface communications in a wireless coverage area may be divided into forward link communications and reverse link communications. On the forward link, certain Walsh codes may be reserved for defining control channels, including a pilot channel, a sync channel, and one or more paging channels, and the remainder may be assigned dynamically for use as traffic channels, i.e., to carry bearer data such as email, web browsing, voice, video, and so on. Similarly, on the reverse link, one or more offsets of a CDMA code (i.e., offsets of a PN long code) may be reserved for defining control channels, such as access channels, and the remaining offsets may be assigned dynamically to WCDs for use as traffic channels.

In order to acquire the signals of a wireless coverage area, a WCD may be configured by its home wireless service provider with a preferred roaming list (PRL) of frequencies to scan when the WCD is seeking cellular service. The frequencies in the PRL may be arranged in a listed order, and the WCD may be arranged to scan the frequencies in the order listed in the PRL, starting with the first-listed frequency. If the WCD cannot receive a signal on the first-listed frequency at sufficient signal strength, the WCD may then scan the next frequency in the PRL. This process may continue until the WCD discovers that it can receive a frequency with a sufficiently strong signal, or the WCD reaches the end of the PRL.

Since the frequency scanning process takes some amount of time (and potentially some amount of the scanning WCD's battery life) per frequency scanned, the PRL may be arranged with the home wireless service provider's most commonly-used frequencies listed first. Frequencies listed further down the PRL may be less-commonly used, or may be frequencies used by roaming partners of the home service provider. In other words, preferred wireless coverage areas may be listed before non-preferred wireless coverage areas in the PRL. Thus, it may be beneficial for a WCD to acquire wireless coverage on a frequency at or near the top of its PRL. In this way, the WCD might avoid roaming, and may also reduce time spent scanning frequencies and avoid some or all of any associated battery drain.

Once a WCD acquires a wireless coverage area on a particular frequency, the WCD may then receive information about the configuration of the wireless coverage area from one or more of the wireless coverage area's pilot channel, sync channel, and paging channel. Through use of this information, the WCD may be able to request traffic channel(s) for bearer communication with the RAN and other devices.

Nonetheless, in some situations, a WCD might not be able to acquire a frequency in its PRL, even when the WCD is ostensibly within range of the frequency's wireless coverage area. Particularly, when scanning the frequency, the WCD may measure an aggregate amount of energy that it receives on that frequency. This aggregate energy may include energy from some or all forward-direction channels associated with the frequency, including, for example, the pilot, sync, paging, and forward traffic channels.

Thus, in terms of CDMA technology, the aggregate energy may be referred to as Io, whereas the ratio Ec/Io is used to quantify received pilot channel signal strength at a WCD (Ec is energy per CDMA chip for the pilot signal). Aggregate energy received by a WCD may also be referred to as the WCD's received signal strength indicator (RSSI).

When a wireless coverage area is lightly loaded, there will be little traffic on its forward traffic channels. As a result, the aggregate energy that the WCD receives on the frequency may be low, perhaps so low that the WCD cannot detect the existence of the wireless coverage area. Therefore, in at least some situations, the loading of a wireless coverage area may correlate to the WCD's ability to detect and acquire use of the wireless coverage area.

Figure 4:
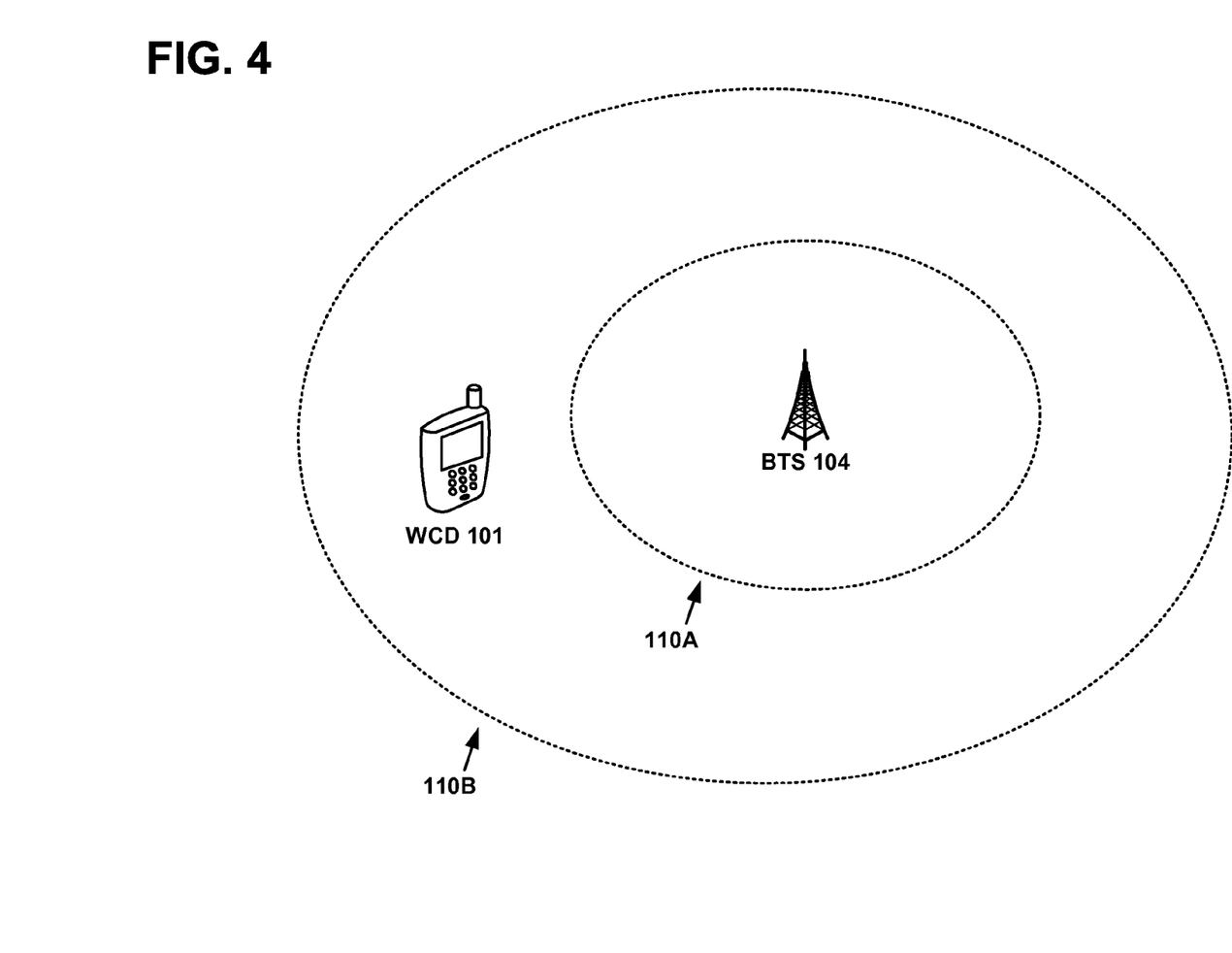
FIG. 4 depicts a WCD and a wireless coverage area, in accordance with an example embodiment.

FIG. 4 illustrates this point. In FIG. 4, BTS 104 radiates to define preferred wireless coverage area 110. Under a normal or heavy load, BTS 104 may radiate such that preferred wireless coverage area 110 extends to the range illustrated by the oval 110B. Under these conditions, WCD 101 is within the coverage of preferred wireless coverage area 110, and may be able to receive enough energy on the frequency of preferred wireless coverage area 110 to be able to acquire coverage from preferred wireless coverage area 110.

However, under a low load, BTS may radiate such that preferred wireless coverage area 110 extends only to the range illustrated by the oval 110A. Under these conditions, WCD 101 is not within the range of preferred wireless coverage area 110. Thus, WCD 101 may not be able to receive enough energy on the frequency to be able to acquire coverage from preferred wireless coverage area 110, despite WCD 101 being within the range of this wireless coverage area.

The situation illustrated in FIG. 4 can occur for a number of reasons. A wireless coverage area may become lightly-loaded during periods of low utilization, such as late evening and early morning hours. Perhaps counter-intuitively, the range of the wireless coverage area may shrink during these periods. For instance, during normal or heavy load, BTS 104 may transmit with 12 Watts of power to form preferred wireless coverage area 110, but under light load, BTS 104 may transmit with only 4 Watts of power to form this wireless coverage area.

Due to this power difference, the location of a WCD may play a role in whether the WCD can acquire coverage from the wireless coverage area. For example, if a WCD is located far from BTS 104, or in a location where wireless signals from BTS 104 are weak (e.g., in a basement or on a high floor of a structure), the WCD may be near the edge of preferred wireless coverage area 110 under normal or heavy load. However, the WCD may be out of coverage when it is in this location and preferred wireless coverage area 110 is lightly loaded. Thus, the mere level of load on a wireless coverage area can determine whether a WCD roams to a different wireless service provider's coverage, or whether the WCD can communicate at all.

As noted previously, a roaming partner may charge the home wireless service provider a fee for each unit of time, unit of data, and/or transaction that the roaming partner serves a roaming WCD. For example, a roaming partner of the home wireless service provider may charge the home wireless service provider when a WCD subscribed to the home wireless service provider uses one or more of the roaming partner's wireless coverage areas. Typically, no fees are charged if a roaming WCD is idle. But, if the roaming WCD makes a substantial use of the roaming partner's wireless coverage area(s), the home wireless service provider may be charged for that use. Such a substantial use might include, for example, making a voice or data call, or sending or receiving a text or multimedia message. Thus, the home wireless service partner may either have to absorb these costs, or pass the costs on to its subscribers. Neither situation is desirable.

Furthermore, as a result of low load in a preferred wireless coverage area, a WCD may not be able to communicate at all. In some situations, a WCD may not be able to detect signals from a lightly-loaded preferred wireless coverage area, and may also be outside the coverage range of other wireless service providers. In these circumstances, the WCD will be, for instance, unable to make a voice or data call.

III. Example Noise Frame Transmission

In order to attempt to overcome the aforementioned undesirable scenarios, the home wireless service provider may take steps to improve its wireless coverage. Particularly, a RAN may be configured with a low-load threshold. The RAN may, from time to time, measure the aggregate load in a wireless coverage area. When the aggregate load is below the low-load threshold, the RAN may begin transmitting noise frames on one or more channels of the wireless coverage area. For example, the noise frames may be transmitted on unused channels (e.g., unused traffic channels), and/or during unused time slots of otherwise used channels. These noise frames may serve to increase the aggregate energy received by WCDs, and may allow at least some WCDs to acquire the wireless coverage area when they otherwise would not.

This result may seem counter-intuitive. Often, wireless service providers seek to improve network conditions by reducing the load on their systems. But here, the opposite is the case. By increasing the load on the wireless coverage area, it becomes more likely that WCDs will be able to acquire and use the wireless coverage area.

The low-load threshold may be configured in a number of ways. For instance, when the number of traffic channels in use by the RAN falls below a particular number (e.g., two, three, five, ten, and so on) for a period of time, the aggregate load may be considered to be below the low-load threshold. Alternatively or additionally, if the aggregate transmit power that the RAN uses to define the wireless coverage area falls below a particular value (e.g., 2 Watts, 4, Watts, 6 Watts, 8 Watts, etc.), the aggregate load may be considered to be below the low-load threshold.

A noise frame may be any sort of transmission that is not entirely bearer or signaling data intended to be received and processed by a WCD. As transmissions in most modern wireless technologies are digital, a noise frame could be any binary representation. Thus, a noise frame may be a series of zeros, a series of ones, a series of random or pseudo-random ones and zeros, or a null frame. In some embodiments, a null frame may be arranged according to a specific data format and may be transmitted at a particular data rate. For example, a null frame might contain 16 ones followed by eight zeros, and be transmitted at 1200 bits per second. However, null frames may contain different arrangements of bits and may be transmitted at different rates.

The RAN may also be configured with a high-load threshold, which could be either greater than or equal to the low-load threshold. When the aggregate load is above the high-load threshold (and thus the RAN is likely to be using more power to define the wireless coverage area), the RAN may stop transmitting the noise frames. Thus, the RAN may be arranged to only transmit noise frames when the range of the wireless coverage area is likely to be small.

In some situations, the wireless coverage area might be located proximate to another wireless coverage area. For instance, the coverage of these two wireless coverage areas may overlap to some extent. If these two wireless coverage areas use the same frequency, or frequencies that are close to one another, the transmission of the noise frames on the wireless coverage may cause interference in the proximate wireless coverage area.

Therefore, the RAN may also measure the utilization of the proximate wireless coverage area. If this utilization is above a second low-utilization threshold, the RAN may refrain from transmitting the noise frames, because they are likely to interfere with communications in the proximate wireless coverage area. However, if the utilization is below the second low-utilization threshold, the RAN may transmit the noise frames.

IV. Example Methods

Figure 5:
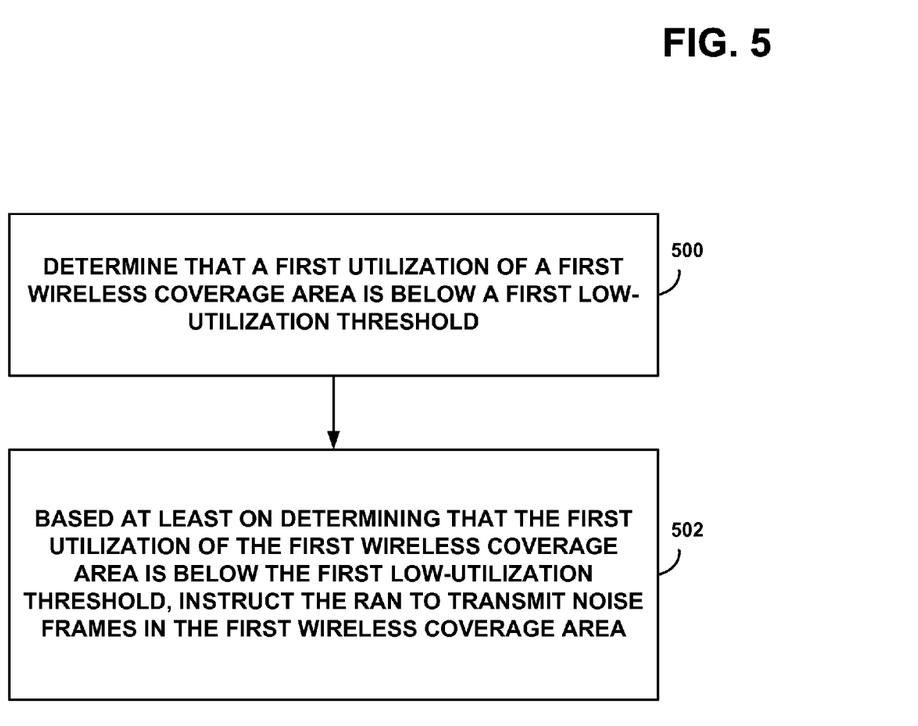
FIG. 5 is a flow chart, in accordance with an example embodiment.

FIG. 5 is a flow chart illustrating an example method. In this embodiment, a RAN may radiate to define a first wireless coverage area that is configured to provide wireless coverage to WCDs.

At step 500, it may be determined that a first utilization of the first wireless coverage area is below a first low-utilization threshold. This step may involve the RAN, or some other entity, measuring the load of the first wireless coverage area. For example, making this determination may involve determining that the measured number of traffic channels in use in the first wireless coverage area is less than a threshold number of traffic channels. This threshold number may take on various values, such as 2, 4, 8, 16, etc. However, the first low-utilization threshold may be based on other aspects of wireless coverage area load, such as the number of WCDs served by the wireless coverage area, the number of active calls using the wireless coverage area, the total forward-direction traffic transmitted on the wireless coverage area in bits per second, a number of transactions served by the wireless coverage area, and so on.

At step 502, possibly based at least on determining that the first utilization of the first wireless coverage area is below the first low-utilization threshold, the RAN may be instructed to transmit noise frames in the first wireless coverage area. In some embodiments, the noise frames may be null frames, or may contain random bits. The noise frames may be transmitted on at least one unused traffic channel of the first wireless coverage area.

Further, it may be determined that a second utilization of the first wireless coverage area exceeds a high-utilization threshold. Then, based on this determination, the RAN may be instructed to stop transmission of noise frames in the first wireless coverage area.

By using both a low-utilization threshold and a high-utilization threshold in this way, the RAN may employ a form of hysteresis, thereby preventing the RAN from switching too frequently between starting and stopping the transmission of noise frames. Thus, the low-utilization threshold may be 20% of maximum load, and the high-utilization threshold may be 40% of maximum load. However, these thresholds may take on other values as well. For example, in some embodiments, the first low-utilization threshold may equal the high-utilization threshold.

The RAN may also radiate to define a second wireless coverage area that is proximate to the first wireless coverage area. The second wireless coverage area may use the same or a similar frequency as used by the first wireless coverage area.

It may be further determined that a second utilization of the second wireless coverage area is below a second low-utilization threshold. Instructing the RAN to transmit noise frames in the first wireless coverage area may also be based on the second utilization being below the second low-utilization threshold. In some embodiments, the first low-utilization threshold may be equal to the second low-utilization threshold. By considering the respective loads on one or more nearby wireless coverage areas, and refraining from transmitting noise frames when these respective loads are above the second low-utilization threshold, the RAN may avoid introducing interference into these wireless coverage areas.

Figure 6:
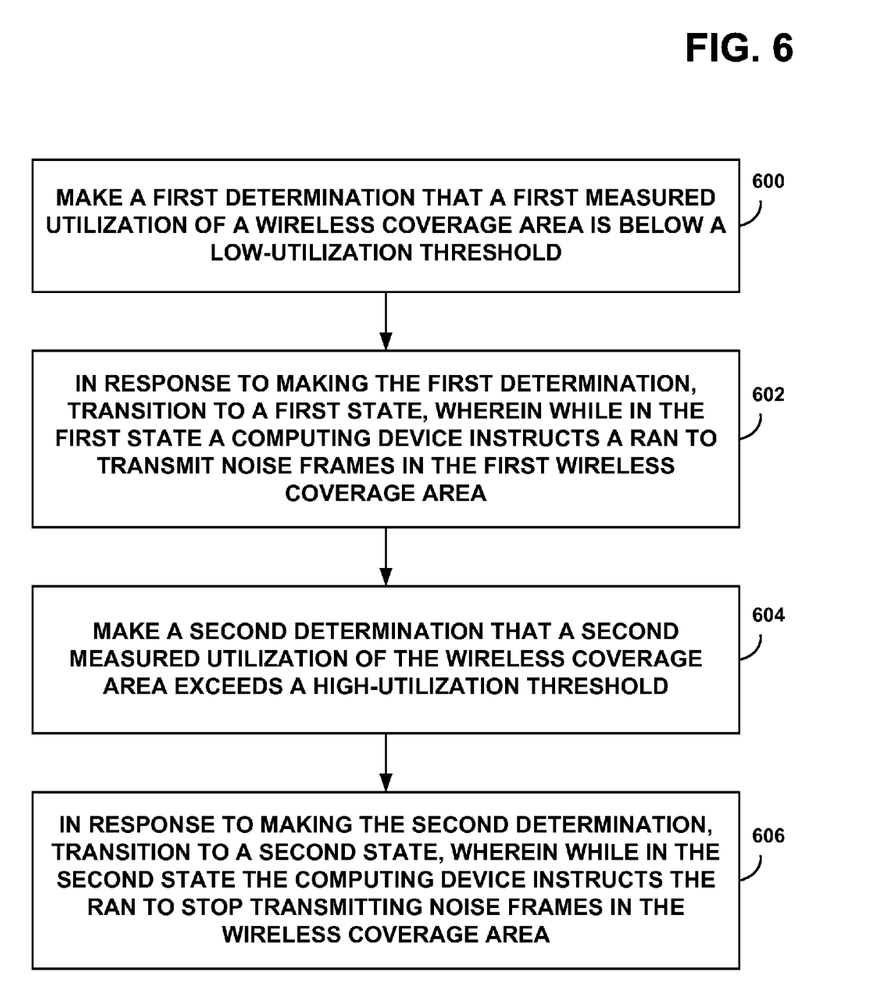
FIG. 6 is another flow chart, in accordance with an example embodiment.

FIG. 6 is a flow chart that illustrates another example method. Similar to the embodiment illustrated by FIG. 5, a RAN may radiate to define a wireless coverage area that is configured to provide wireless coverage to WCDs. At step 600, a first determination that a first measured utilization of the wireless coverage area is below a low-utilization threshold may be made. At step 602, possibly in response to making the first determination, a computing device may transition to a first state. While in the first state, the computing device may instruct the RAN to transmit noise frames in the wireless coverage area.

At step 604, a second determination that a second measured utilization of the wireless coverage area exceeds a high-utilization threshold may be made. At step 606, possibly in response to making the second determination, the computing device may transition to a second state. While in the second state, the computing device may instruct the RAN to stop transmitting noise frames in the wireless coverage area.

The steps of FIGS. 5 and/or 6 may be carried out by a RAN component, such as a BTS, BSC, or RNC. However, in some embodiments, these steps may be carried out by another computing device that collects load measurements from the RAN and instructs the RAN when to start and stop transmitting noise frames in any particular wireless coverage area. This computing device may be a standalone server that is located inside or outside of the RAN. Furthermore, some of the steps in the flow charts of these figures may be distributed between two or more physically or logically distinct devices.

It should be understood that FIGS. 5 and 6 depict non-limiting embodiments. Thus, more or fewer steps than shown in FIGS. 5 and 6 may be used without departing from the scope of the embodiments herein. Additionally, any of these steps may be repeated one or more times, or may be omitted altogether. Moreover, these steps may occur in a different order than shown in FIGS. 5 and 6. Further, the flow charts of these figures may be combined with one another, in whole or in part. For instance, any of the additional features discussed in the context of FIG. 5 may also be applied to FIG. 6.

A step or block in any figure herein representing a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of tangible, non-transitory computer-readable medium, such as a storage device including a disk or hard drive, or other storage media.

V. Conclusion

Example embodiments have been described above. Those skilled in the art will understand, however, that changes and modifications may be made to these embodiments without departing from the true scope and spirit of the invention, which is defined by the claims.

The invention claimed is:

1. A method comprising:
   determining that a first utilization of a first wireless coverage area is below a first low-utilization threshold, wherein a radio access network (RAN) radiates to define the first wireless coverage area and the first wireless coverage area is configured to provide wireless coverage to wireless communication devices (WCDs), and wherein determining that the first utilization of the first wireless coverage area is below the first low-utilization threshold comprises determining that a measured number of traffic channels in use in the first wireless coverage area is less than a threshold number of traffic channels;
   based at least on determining that the first utilization of the first wireless coverage area is below the first low-utilization threshold, instructing the RAN to transmit noise frames in the first wireless coverage area; determining that a second utilization of the first wireless coverage area exceeds a high-utilization threshold; and
   based at least on determining that the second utilization of the first wireless coverage area exceeds the high-utilization threshold, instructing the RAN to stop transmission of noise frames in the first wireless coverage area.

2. The method of claim 1, wherein the RAN also radiates to define a second wireless coverage area that is proximate to the first wireless coverage area, the method further comprising:
   determining that a third utilization of the second wireless coverage area is below a second low-utilization threshold,
   wherein instructing the RAN to transmit noise frames in the first wireless coverage area is also based on determining that the third utilization of the second wireless coverage area is below the second low-utilization threshold.

3. The method of claim 2, wherein the first low-utilization threshold is equal to the second low-utilization threshold.

4. The method of claim 1 wherein the first low-utilization threshold is equal to the high-utilization threshold.

5. The method of claim 1, wherein the noise frames are null frames.

6. The method of claim 1, wherein the noise frames contain random bits.

7. The method of claim 1, wherein the noise frames are transmitted on at least one unused traffic channel of the first wireless coverage area.

8. A computing device comprising:
   a processor;
   data storage; and
   program instructions, stored in the data storage that, upon execution by the processor, cause the computing device to (i) determine that a first utilization of a first wireless coverage area is below a first low-utilization threshold, wherein a radio access network (RAN) radiates to define the first wireless coverage area and the first wireless coverage area is configured to provide wireless coverage to wireless communication devices (WCDs), and wherein determining that the first utilization of the first wireless coverage area is below the first low-utilization threshold comprises determining that a measured number of traffic channels in use in the first wireless coverage area is less than a threshold number of traffic channels; (ii) based at least on determining that the first utilization of the first wireless coverage area is below the first low-utilization threshold, instruct the RAN to transmit noise frames in the first wireless coverage area (iii) determining that a second utilization of the first wireless coverage area exceeds a high-utilization threshold, and (iv) based at least on determining that the second utilization of the first wireless coverage area exceeds the high-utilization threshold, instructing the RAN to stop transmission of noise frames in the first wireless coverage area.

9. The computing device of claim 8, wherein the RAN also radiates to define a second wireless coverage area that is proximate to the first wireless coverage area, the computing device further comprising:
  program instructions, stored in the data storage that, upon execution by the processor, cause the computing device to determine that a third utilization of the second wireless coverage area is below a second low-utilization threshold, wherein instructing the RAN to transmit noise frames in the first wireless coverage area is also based on determining that the third utilization of the second wireless coverage area is below the second low-utilization threshold.

10. The computing device of claim 9, wherein the first low-utilization threshold is equal to the second low-utilization threshold.

11. The computing device of claim 8, wherein the first low-utilization threshold is equal to the high utilization threshold.

12. The computing device of claim 8, wherein the noise frames are null frames.

13. The computing device of claim 8, wherein the noise frames contain random bits.

14. The computing device of claim 8, wherein the noise frames are transmitted on at least one unused traffic channel of the first wireless coverage area.

15. A method comprising:
  making a first determination that a first measured utilization of a wireless coverage area is below a low-utilization threshold, wherein a radio access network (RAN) radiates to define the wireless coverage area and the wireless coverage area is configured to provide wireless coverage to wireless communication devices (WCDs) and wherein determining that the first measured utilization of the wireless coverage area is below the low-utilization threshold comprises determining that a measured number of traffic channels in use in the wireless coverage area is less than a threshold number of traffic channels;
  in response to making the first determination, a computing device transitioning to a first state, wherein while in the first state the computing device instructs the RAN to transmit noise frames in the wireless coverage area;
  making a second determination that a second measured utilization of the wireless coverage area exceeds a high-utilization threshold; and
  in response to making the second determination, the computing device transitioning to a second state, wherein while in the second state the computing device instructs the RAN to stop transmitting noise frames in the wireless coverage area.

16. The method of claim 15, wherein the noise frames are transmitted on at least one unused traffic channel of the wireless coverage area.

* * * * *